United States Patent [19]
Anthos et al.

[11] Patent Number: 6,038,308
[45] Date of Patent: Mar. 14, 2000

[54] ISDN PRIMARY RATE INTERSWITCH MAIL USING NON-CALL ASSOCIATED TEMPORARY SIGNALLING

[75] Inventors: Mark G. Anthos; Dennis Doyle, both of Plainfield; Wayne Harbuziuk, Wheaton, all of Ill.

[73] Assignee: Rockwell Semiconductor Systems, Inc., Newport Beach, Calif.

[21] Appl. No.: 08/967,479

[22] Filed: Nov. 11, 1997

[51] Int. Cl.[7] .................................................. H04M 7/00
[52] U.S. Cl. ...................... 379/219; 379/93.24; 379/265; 379/212; 379/229
[58] Field of Search .................................. 379/265, 266, 379/309, 201, 210, 212, 216, 207, 211, 142, 93.24, 219, 229, 88.14, 88.18

[56] References Cited

U.S. PATENT DOCUMENTS

| | | | |
|---|---|---|---|
| 5,469,504 | 11/1995 | Blaha | 379/265 |
| 5,490,211 | 2/1996 | Adams et al. | 379/265 |
| 5,500,891 | 3/1996 | Harrington et al. | 379/265 |
| 5,526,416 | 6/1996 | Dezonno et al. | 379/265 |
| 5,530,740 | 6/1996 | Irribarren et al. | 379/93.24 |
| 5,675,631 | 10/1997 | Kaminsky et al. | 379/196 |
| 5,684,870 | 11/1997 | Maloney et al. | 379/309 |
| 5,724,419 | 3/1998 | Harbuziuk et al. | 379/265 |
| 5,764,733 | 6/1998 | Kaminsky et al. | 379/220 |
| 5,793,861 | 8/1998 | Haigh | 379/266 |
| 5,815,565 | 9/1998 | Doremus et al. | 379/265 |
| 5,907,611 | 5/1999 | Dezonno et al. | 379/265 |

*Primary Examiner*—Scott Wolinsky
*Assistant Examiner*—Benny Q. Tieu
*Attorney, Agent, or Firm*—Welsh & Katz, Ltd.

[57] ABSTRACT

A method and apparatus for sending interswitch mail within a private automatic call distribution system from a first user to a second user of the automatic call distribution system using non-call associated temporary signalling connections. The method includes the steps of receiving a mail request from the first user to the second user of the private automatic call distribution system and determining a switch routing path from the first user to the second user. The method further includes the steps of requesting a private network type connection between the first switch and the second switch and transferring the mail from the first user to the second user using an ISDN protocol over the requested private type connection.

18 Claims, 4 Drawing Sheets

FIG. 2

| BITS OCTET | 8 | 7 | 6 | 5 | 4 | 3 | 2 | 1 | |
|---|---|---|---|---|---|---|---|---|---|
| 1 | 0 | 1 | 1 | 1 | 1 | 1 | 1 | 0 | 100 USER-TO-USER I.E. IDENTIFIER |
| 2 | LENGTH OF USER - TO - USER I.E. ||||||||102 |
| 3 | 0 | 0 | 0 | 0 | 0 | 1 | 1 | 0 | 104 MAIL IDENTIFIER |
| 4 | DESTINATION NODE CHARACTER 1 |||||||| 106 |
| 5 | DESTINATION NODE CHARACTER 2 |||||||| 108 |
| 6 | DESTINATION NODE CHARACTER 3 |||||||| 110 |
| 7 | DESTINATION NODE CHARACTER 4 |||||||| 112 |
| 8 | DESTINATION PHONE NUMBER (D1,D2) |||||||| 114 |
| 9 | DESTINATION PHONE NUMBER (D3,D4) |||||||| 116 |
| 10 | SOURCE NODE CHARACTER 1 |||||||| 118 |
| 11 | SOURCE NODE CHARACTER 2 |||||||| 120 |
| 12 | SOURCE NODE CHARACTER 3 |||||||| 122 |
| 13 | SOURCE NODE CHARACTER 4 |||||||| 124 |
| 14 | SOURCE PHONE NUMBER (D1,D2) |||||||| 126 |
| 15 | SOURCE PHONE NUMBER (D3,D4) |||||||| 128 |
| 16 | NUMBER OF MESSAGE CHARACTER OCTETS |||||||| 130 |
| 17 | MESSAGE CHARACTER 1 |||||||| 132 |
| 18 | MESSAGE CHARACTER 2 |||||||| 134 |
| ⋮ | ⋮ |||||||| |
| 96 | MESSAGE CHARACTER 80 |||||||| 136 |

40

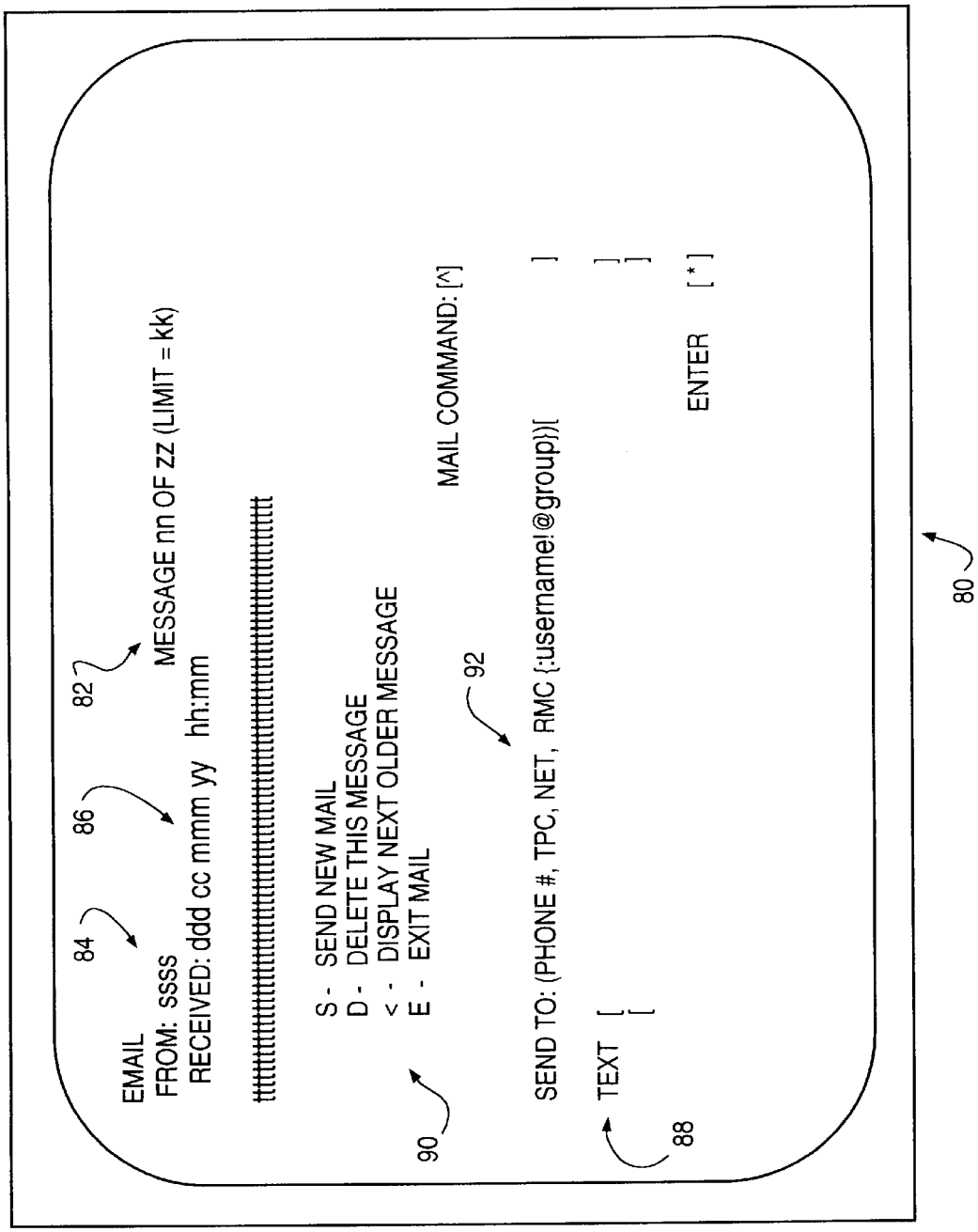

ISDN PRIMARY RATE INTERSWITCH MAIL USING NON-CALL ASSOCIATED TEMPORARY SIGNALLING

FIELD OF THE INVENTION

The field of the invention relates to electronic mail within private telephone systems and in particular to interswitch electronic mail using a switching fabric of an automatic call distributor system.

BACKGROUND OF THE INVENTION

Automatic call distribution systems are known. Such systems are typically used in an organizational context as a means of distributing telephone calls among a group of agents of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the ACD may distribute the calls based upon which agent position (telephone) has been idle the longest. Alternatively, call distribution may be based upon a level of skill of an agent or by the source of the call.

In order to distribute incoming calls from the PSTN to the available agents, the interaction of a controlling computer with a switching fabric of the ACD becomes essential. Often a connection to a local PSTN is in the form of a number of trunk connections. Each of the trunk connections is monitored by the controller for incoming calls. Where a call is detected, the controller searches for and selects an idle agent. Upon selecting an agent, the controller instructs the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer the call to a queue for the selected agent or directly to the selected agent. At the same time that the call is delivered to the agent, the controller sends an identifier of the selected agent and ANI number of the customer to a controller of the database (the host). The host, in turn, retrieves the customer records and displays the customer records via a computer monitor of the selected agent at the same time the call is delivered.

As a further feature, calls may be transferred among agents. Where a first agent finds that he or she cannot help a particular customer, the agent may activate a key on a keyboard of the agent and enter an identity of another agent or agent group that may be better able to help the customer. The controller of the ACD may immediately connect the call to the newly identified agent, or may place the call in a queue until the identified agent becomes available.

In either case, the controller transfers a message to the host identifying the previous and newly identified agent. Since the host knows the identity of the customer displayed at the terminal of the previous agent, the host may now display those same customer records at the terminal of the newly selected agent.

Where a call is placed in a queue, the ACD controller may monitor a total time that the call has been in the queue. Where the time exceeds a threshold value, the controller may transfer (overflow) the call to a newly selected agent at another less heavily loaded ACD (overflow ACD) within the same organization. The controller of the transferring ACD transfers DNIS and ANI information as well as a call sequence number assigned by the transferring ACD to the overflow ACD. The overflow ACD, upon receiving the call, transfers the information to the host including an identifier that the call is an overflow call. The host, in turn, transfers the customer records to the newly selected agent.

With regard to geographical layout of an ACD system, often the switches of the ACD system are relatively widely distributed with small groups of agents assigned to each switch. Further, the switches may be in different time zones which offers the opportunity of load sharing where agents may be used to share an incoming call load of a particular region based upon time of day or other factors.

In order to coordinate efforts among switches of the ACD system, supervisors at each switch may often need to communicated with other supervisors at other switches. Agents at one switch may be overloaded, while agents at another switch may be idle. A supervisor may wish to request the help of another supervisor in dealing with a particular type of problem associated with operation of an ACD. For these reasons, a supervisor may need a means of quickly and easily communicating with other supervisors, that is not dependent upon a voice connection or the immediate presence of a supervisor at the other switch.

While an E-mail connection through the PSTN could be used for messages between supervisors, it would involve an additional, separate connection with the PSTN. Further, communication through a local area network (LAN) or wide area network (WAN) is an expensive alternative in a telephony system where the processing time of a host computer is reserved for very specific processes such as call routing and system optimization. Accordingly a need exists for a means of exchanging electronic mail between supervisory terminals using the interswitch communication facilities of the ACD system.

SUMMARY

In one embodiment of the invention, a novel method and apparatus are provided for sending interswitch mail within a private automatic call distribution system from a first user to a second user of the automatic call distribution system using non-call associated temporary signalling connections. The method includes the steps of receiving a mail request from the first user to the second user of the private automatic call distribution system and determining a switch routing path from the first user to the second user. The method further includes the steps of requesting a private network type connection between the first switch and the second switch and transferring the mail from the first user to the second user using an ISDN protocol over the requested private type connection.

BRIEF DESCRIPTION OF THE DRAWINGS

FIG. 2 illustrates a format of an interswitch mail message that may be transferred by the system of FIG. 1;

FIG. 3 depicts a screen format that may be used by the terminals of FIG. 1; and

DETAILED DESCRIPTION OF AN EMBODIMENT

Figure 1:
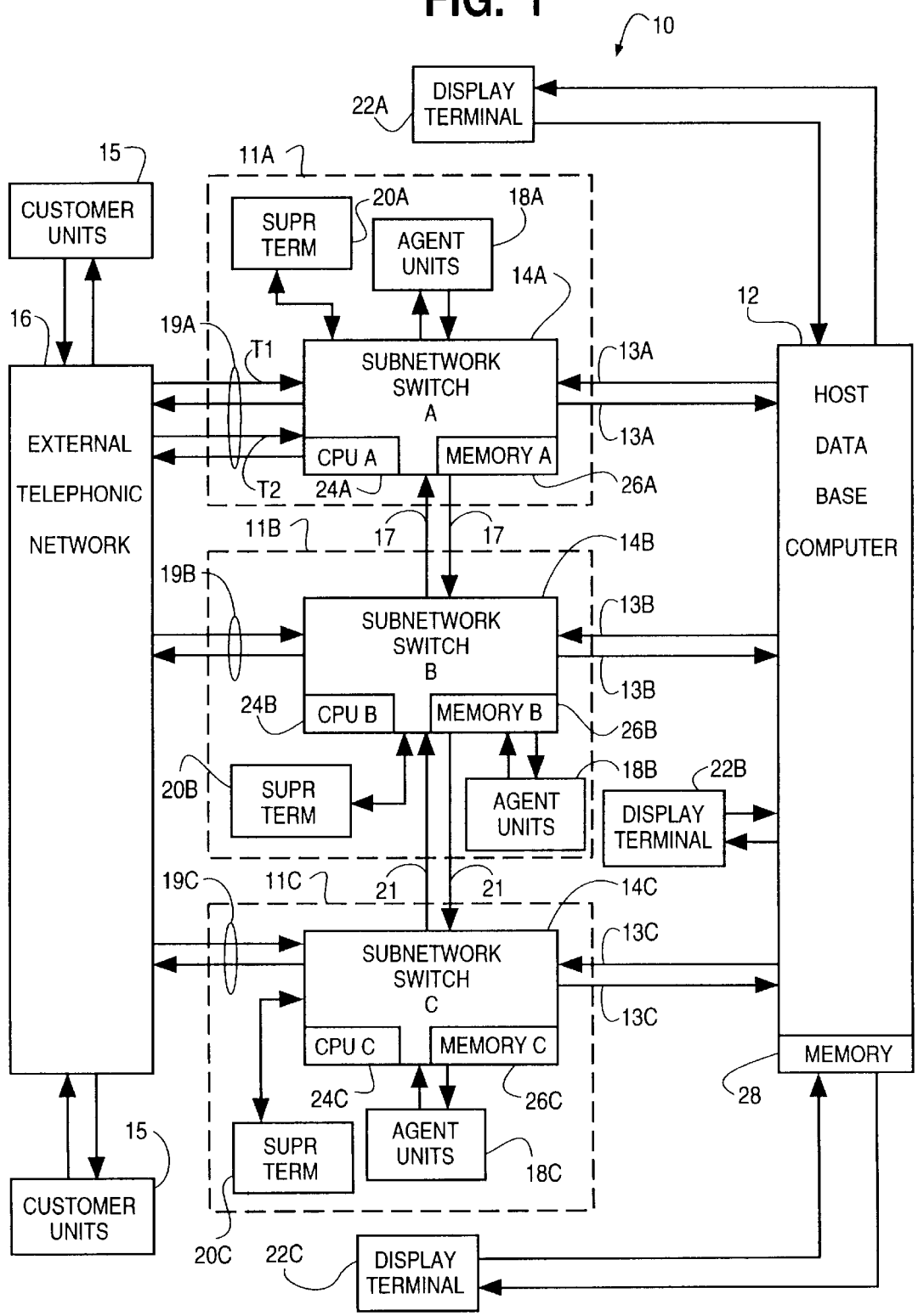
FIG. 1 is a block diagram of an ACD system for transferring interswitch mail in accordance with an illustrated embodiment of the invention.

FIG. 1 is a block diagram of an automatic call distribution system 10 generally under an illustrated embodiment of the invention. Under the embodiment, a first, second and third internal network 11A, 11B, 11C are connected to a host database computer 12 and the PSTN 16. Internal networks 11A, 11B, 11C may be located at geographically diverse locations and may be interconnected one-to-another by an appropriate interconnecting group of private lines 17, 21 (e.g., leased lines, virtual private lines, microwave links, dedicated Tl lines, etc.). Similarly, the internal networks 11A, 11B, 11C may be interconnected with the host 12 through an appropriate data link 13A, 13B, 13C (e.g., leased lines, virtual private lines, microwave link, the Internet, digital packet switching, etc.).

The internal networks 11A, 11B, 11C may be connected to the PSTN 16 through a number of trunk lines 19A, 19B, 19C. The PSTN 16 may offer service on the trunk lines 19A, 19B 19C in association with services such as ANI and DNIS. Call control, call maintenance, and call set-up may be accomplished over the trunk line itself or over an associated control channel.

DNIS information supplied by the PSTN 16 is useful for the internal networks 11A, 11B, 11C where inbound calls to the internal networks 11A, 11B, 11C may be directed to any of a large block of telephone numbers assigned to each of the internal networks 11A, 11B, 11C. This may be useful where the block of numbers to the internal network (e.g., 11A) is connected through the trunk lines 19A in rotary fashion, so that when the calling party from the PSTN appears, for example, on trunk T1, it can be determined whether the calling party was, in fact, calling the telephone number corresponding to trunk T1 or was, in fact, calling the telephone number corresponding to trunk T2 and was rotated down to the next available trunk, T1.

With regard to inbound calls, the switches 14A, 14B, 14C function to selectively interconnect calls from external customer units 15 of the external PSTN 16 to agents 18A, 18B, 18C of the internal networks 11A, 11B, and 11C. As such, each switch 14A, 14B, and 14C functions as an automatic call distributor within its own internal ACD network 11A, 11B, and 11C.

The switches 14A, 14B, and 14C are controlled by central processing units, or CPUS, 24A, 24B, 24C, in conjunction with peripheral memory devices 26A, 26B, 26C. Control of the switches 11A, 11B, 11C and communications with the host 12 and PSTN 16 may be accomplished generally as described in U.S. Pat. No. 5,268,903, and U.S. Pat. No. 5,140,611, both to Jones, and both incorporated herein by reference. Routing of calls to agents 18A, 18B, 18C and overflow of calls may be accomplished generally as described in: U.S. Pat. No. 5,335,269 to Steinlicht et al.; U.S. Pat. No. 5,365,581 to Baker et al.; and U.S. Pat. No. 5,384,841 to Adams et al., all incorporated herein by reference.

Under one embodiment, each ACD 11A, 11B, 11C has a supervisor terminal 20A, 20B, 20C interconnected with a CPU 24A, 24B, 24C of the ACD 11A, 11B, 11C. The supervisor terminal 20A, 20B, 20C is typically used for setup and control of the switch 14A, 14B, 14C. For example, the supervisor terminal 20A, 20B, 20C may be used for entry of switch operating parameters (e.g., priority level assigned to calls, overflow parameters, agent identities, etc.).

The supervisor terminal 20A, 20B, 20C may also be used for creating and optimizing call handling routines. For example, the supervisors terminal 20A, 20B, 20C may be used to create the subroutines which accept call associated data (e.g., DNIS, ANI, etc.) from the PSTN 16 and which subroutines route the calls based upon the received information. Agent groups may be defined using the supervisor terminal 20A, 20B, 20C, as well as defining the called number directed to those groups.

Under one embodiment, the CPUs 24A, 24B, 24C accept messages from the supervisor terminals 20A, 20B, 20C and forward those messages to other supervisor terminals 20A, 20B, 20C within and through other switches 11A, 11B, 11C based upon the information content of the message. FIG. 2 depicts a message format of an illustrated embodiment of an interswitch mail packet 40 received by a CPU 24A, 24B, 24C from a supervisor terminal 20A, 20B, 20C and transferred as interswitch mail to another supervisor terminal 20A, 20B, 20C in accordance with the embodiment.

Under the illustrated embodiment, the packet 40 may be transferred in a manner similar to call routing information. Such routing information may be transferred over the interconnects 17, 21 between switches under an ISDN format. Where a primary rate interface (PRI) is used, the packet 40 may be transferred over a "D" channel of the PRI.

FIG. 3 is an example of a screen format 80 that may be used by a supervisor terminal 20A, 20B, 20C in sending and receiving interswitch mail messages. To enter a mail mode, a supervisor terminal 20A, 20B, 20C may place their terminal off-line and enter a MAIL command.

Once in the mail mode a CRT of the supervisor terminal 20A, 20B, 20C may display the information shown in FIG. 3. A status message 82 may be provided containing the total number of mail messages stored (zz) for the terminal position, an indication of which message (nn) is currently being displayed and the maximum size (kk) of the mailbox. The remainder of the window 80, initially displayed, may be a "read mail window" which contains the last message received. This message displays the source 84 of the message, the date and time 86 that the message was sent and the text 88 of the message. The address of the user is shown in a "send to" field 92.

A menu 90 of commands is also presented in the window 80. A user may click on a first line of the menu or enter an S to initiate the process of sending a mail message. The user may click on the second line or enter a D to delete a currently displayed message. The next previous message may be displayed by clicking on the third line or entering a "<" character. Finally, the user may exit from the mail utility by clicking on the fourth line or entering an E.

To send a mail message, the user clicks on the first line of the menu 90. In response the window 80 may be displayed with blank data fields 84, 82, 88, 92. The four digit telephone number of the sender may be automatically entered into the "FROM" field 84. The sender may enter a message in the text field 88 of up to 80 characters. The sender may address the message by entering a four-digit extension in the "sent to" field 92. The message may be sent by activating the ENTER key.

Alternatively, where a message is to be directed to a resource management center (RMC), the address may be considerably longer (as shown by the datafield 92 in FIG. 3). Where a message is to be directed to a RMC, the address may include a teleprinter for calls (TPC) address, a NET address, or an RMC address (e.g., RMC, RMC:username or RMC@group address). Mail sent to an RMC may be converted by the RMC from an interswitch format into a VAX/VMS mail message. If a conversion facility is not available at the RMC then all messages to the RMC may default to the RMC Line Printer.

Upon activating the ENTER function at the supervisor terminal 20A, 20B, 20C, the contents of the window 80 are sent to the CPU 24A, 24B, 24C of the switch 11A, 11B, 11C. Within the CPU 24A, 24B, 24C, the contents of the window 80 are formatted into the packet 40 of FIG. 2, which is then sent as part of a SETUP message to the destination switch 11A, 11B, 11C.

A first octet 100 of the packet 40 identifies the packet 40 as a user-to-user information element (IE) identifier. A second octet 102 specifies the length of the packet 40. The third octet 104 identifies the packet 40 to a receiving switch as an interswitch mail message. Octets four through seven specify the node 11A, 11B, 11C within the ACD system 10 to which the mail packet 40 is to be delivered. Octets eight and nine specify the destination phone number of the recipient of the message. Octets ten through thirteen specify the node of the originator of the message. Octets fourteen and fifteen are the telephone number of the message originator. Octet sixteen specifies the length of the text of the interswitch mail message. Octet seventeen through 96 are the text of the mail message.

Octets four through seven are determined by the originating CPU 24A, 24B, 24C by reference to a look-up table within a memory 26A, 26B, 26C. The four digit telephone number of the "SEND TO" field 92 are used by the CPU 24A, 24B, 24C as an index to locate the destination node within the look-up table.

Similarly, octets ten through thirteen are determined by the originating CPU by reference to a look-up table within a memory. The four digit telephone number of the sender are used by the CPU 24A, 24B, 24C as an index to locate the source node within the look-up table.

To select a trunk group of transmission of the interswitch mail packet 40 to a destination user, the CPU 24A, 24B, 24C again refers to a routing table. The routing table is entered using the node number. A cross-reference against the node number identifies a trunk group associated with a mail destination.

The use of a non-call associated (NCA) temporary signalling connection (TSC) allows interswitch mail to be sent without setting up a circuit-switched connection. This method is used so that an ISDN B-channel is not needed (or allocated) for the transmission of the message. A TSC is established and cleared in a manner similar to the control of a circuit-switched connection.

To transmit interswitch mail the interswitch mail packet 40 is included as part of a SETUP message. The interswitch mail packet 40 appears at the end of the SETUP message (i.e., after all other information elements). The packet 40 may be implemented as a codeset 7, rather than a standard codeset 0.

The SETUP message also contains an ISDN bearer capability and a channel identification information element identifying a TSC to be established on SAPI=0. The ISDN bearer capability may be coded with an information transfer capability (octet 3) which indicates restricted digital information (e.g., using a value of 9). The transfer mode (octet 4) may indicate packet mode (e.g., using an value of 2). Layers 2 and 3 of the ISDN protocol identification field (octets 6 and 7 respectively) may indicate protocol levels Q.921(2.) and Q.931(2.), respectively.

The ISDN channel identification may be coded to indicate within the preferred/exclusive octet (octet 3) that channel use is exclusive (e.g., using a value of 1). The channel indicator (octet 3) may indicate (e.g., using a value of 1) that the channel identified is the D-channel. The information channel selection (octet 3) may indicated (e.g., using a value of 0) that no information channel has been selected.

The network specific facilities may also be set up to facilitate the transmission of interswitch mail. For example, the binary facility coding (octet 4) may be used to specify that a Private Network service type is requested for the channel specified in the identified trunk group.

Using the SETUP message, a D-channel is allocated for transmission of the interswitch mail packet 40 through the identified trunk group. When an ACD receives the mail packet 40, the user-to-user IE serves as an indication that the packet 40 is an interswitch mail message. Identification of the packet 40 as being a mail message starts the process of determining how to route the call at the receiving switch 11A, 11B, 11C. The order of precedence for routing the call at the receiving switch is as follows.

First, if the switch node identifier indicates to the receiving switch 11A, 11B, 11C that it is the destination of the interswitch mail, then it will act upon delivery of the packet 40 to deliver the message locally. If the switch 11A, 11B, 11C determines that the mail destination is another switch, the intermediate switch 11A, 11B, 11C will consult its mail path table to see if it is connected to that node. If so, it will attempt to pass on the packet 40 to the proper switch 11A, 11B, 11C via the route indicated by the routing table. The intermediate switch 11A, 11B, 11C will then send a fast CONNECT message to the originating switch 11A, 11B, 11C.

Figure 4:
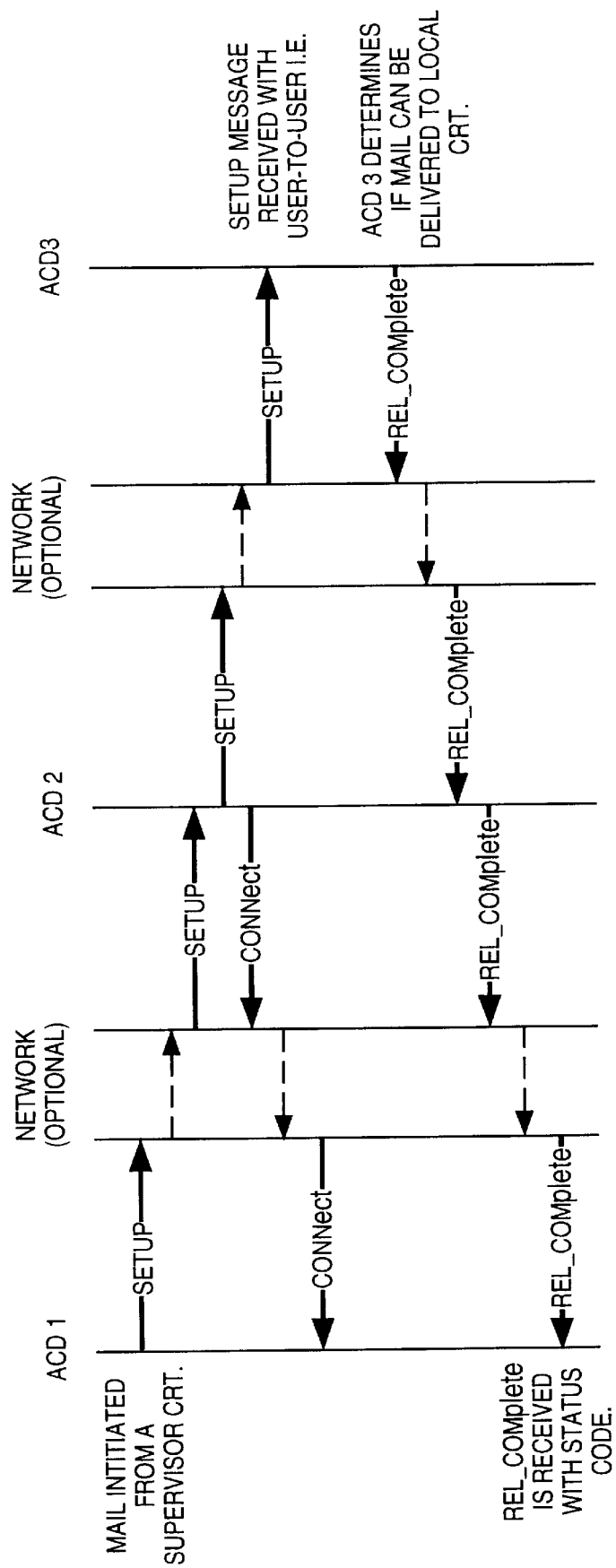
FIG. 4 depicts a bounce diagram that may be used by the system of FIG. 1.

Upon delivery of the packet 40, a call clearing message (RELease COMPlete, DISConnect) may be returned to the source switch 11A, 11B, 11C. A disposition code may also be returned. For example, FIG. 4 displays a bounce diagram for a mail message transferred from a first ACD 11A to a third ACD 11C.

Upon delivery, the packet 40 may be stored in memory 26A, 26B, 26C until the mail function is activated through the terminal 20A, 20B, 20C. The packet 40 may also remain stored in memory until the user requests that the message be deleted through the on-line command DELETE. Up to 20 messages may be stored in memory.

A hex 10 may be used to indicate that the message was successfully sent to the proper terminal 20A, 20B, 20C. This may be used as an indication that the interswitch mail packet 40 was successfully written to the terminal's mailbox. The words MESSAGE DELIVERED may be displayed at the user's terminal 20A, 20B, 20C as an indication of the successful delivery of the interswitch mail packet 40.

Alternatively, a disposition code of hex 11 may be returned. A hex 11 may be used to indicate that the mail was not delivered because the destination mailbox was full. This may be used as an indication from the destination switch that the destination terminal already has the maximum 20 mail messages already stored on a disk associated with that terminal 20A, 20B, 20C. The words MAIL NOT SENT - DESTINATION MAILBOX FULL may be displayed at the sender's terminal 20A, 20B, 20C.

A hex 02 may be used to indicate that the mail was not sent because of an invalid destination. This may be an indication from the destination switch that the destination terminal 20A, 20B, 20C is undefined (e.g., an invalid phone number, a phone number not assigned to a supervisor, etc.). It may also be an indication to the source switch that the destination switch cannot locate the destination terminal in its call routing table. The words MAIL NOT SENT - DESTINATION INVALID may be displayed at the sender's terminal 20A, 20B, 20C.

A hex 2B may be used to indicate that the mail was not delivered because a mailbox update failed. This may be an indication from the destination switch that a disk read/write failure has occurred while updating the terminal's mailbox. The words MAIL NOT SENT - MAILBOX UPDATE FAILED may be displayed at the sender's terminal 20A, 20B, 20C.

A hex 22 may be used to indicate that the mail route was unavailable. This may be an indication from the destination or an intermediate switch that there are no ISDN D-channels available or in-service or no trunks available (for public network connection) for the route identified in the routing table. The words MAIL ROUTE UNAVAILABLE may be displayed at the sender's terminal 20A, 20B, 20C.

Specific embodiments of a method and apparatus of implementing an interswitch mail system according to the present invention have been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

We claim:

1. A method of sending interswitch mail within a private automatic call distribution system from a first user to a second user of the automatic call distribution system using non-call associated temporary signaling connections, such method comprising the steps of:

receiving a request for an electronic mail transfer from the first user to the second user of the private automatic call distribution system;

determining a switch routing path from the first user to the second user;

requesting a non-call associated temporary signaling connection between a first switch and a second switch of the automatic call distribution system; and transferring the mail from the first user to the second user using an ISDN protocol over the requested non-call associated temporary signaling connection.

2. The method as in claim 1 wherein the step of determining a switch routing path further comprises consulting a mail path table in a memory of a first switch associated with the first user for determining an outgoing trunk group for routing the interswitch mail from the first switch to a second switch associated with the second user.

3. The method as in claim 2 wherein the step of sending interswitch mail further comprises composing an information element of the interswitch mail by the first user.

4. The method as in claim 3 wherein the step of composing an information element further comprises including an information field in the information element identifying the information element is a user-to-user message.

5. The method as in claim 3 wherein the step of composing an information element further comprises including an information field in the information element identifying the information element is an interswitch mail message.

6. The method as in claim 3 wherein the step of composing an information element further comprises including an information field in the information element specifying a length of the information element.

7. The method as in claim 3 wherein the step of composing an information element further comprises including an information field of the information element identifying a computer node of the second user.

8. The method as in claim 3 wherein the step of composing an information element further comprises including an information field of the information element identifying a destination telephone number of the second switch.

9. The method as in claim 3 wherein the step of composing an information element further comprises including an information field of the information element identifying a computer node of the first user.

10. The method as in claim 3 wherein the step of composing an information element further comprises including an information field in the information element specifying a length of a user-to-user message of the information element.

11. Apparatus for sending interswitch mail within a private automatic call distribution system from a first user to a second user of the automatic call distribution system using non-call associated temporary signaling connections, such apparatus comprising:

means for receiving a mail request from the first user to the second user of the private automatic call distribution system;

means for determining a switch routing path from the first user to the second user;

means for requesting a non-call associated temporary signaling connection between the first switch and the second switch; and means for transferring the mail from the first user to the second user using an ISDN protocol over the requested non-call associated temporary signaling connection.

12. The apparatus as in claim 11 wherein the means for determining a switch routing path further comprises means for consulting a mail path table in a memory of a first switch associated with the first user for determining an outgoing trunk group for routing the interswitch mail from the first switch to a second switch associated with the second user.

13. The apparatus as in claim 11 wherein the means for sending interswitch mail further comprises means for composing an information element of the interswitch mail by the first user.

14. Apparatus for sending interswitch mail within a private automatic call distribution system from a first user to a second user of the automatic call distribution system using non-call associated temporary signaling connections, such apparatus comprising:

a call processor which receives a mail request from the first user to the second user of the private automatic call distribution system;

a routing processor which determines a switch routing path from the first user to the second user;

a communication processor which requests a non-call associated temporary signaling connection between the first switch and the second switch; and a packet processor which transfers the mail from the first user to the second user using an ISDN protocol over the requested non-call associated temporary signaling connection.

15. The apparatus as in claim 14 wherein the routing processor further comprises a memory containing a mail path table which determines an outgoing trunk group for routing the interswitch mail from the first switch to a second switch associated with the second user.

16. The apparatus as in claim 15 wherein the apparatus for sending interswitch mail further comprises a terminal used by the first user for composing an information element of the interswitch mail.

17. The apparatus as in claim 16 further comprising a host computer which sends the information element to the first switch.

18. The apparatus as in claim 17 further comprising call analyzer which recognizes receipt of the information element by the first switch as the request for transmission of the information element as interswitch mail.

\* \* \* \* \*